United States Patent [19]
Echigoya et al.

[11] 3,764,636
[45] Oct. 9, 1973

[54] METHOD FOR PRODUCING PENTENES

[76] Inventors: Etsuro Echigoya, 20-5, Aobadai-2, Midori-ku, Yokohama; Atsuo Kobayashi, 28-17, Kyodo-2, Setagaya-ku, Tokyo, both of Japan

[22] Filed: Mar. 10, 1971

[21] Appl. No.: 123,028

[30] Foreign Application Priority Data
Sept. 14, 1970 Japan.............................. 45/80731

[52] U.S. Cl.......................... 260/683.15 R, 252/465
[51] Int. Cl............................................... C07c 3/20
[58] Field of Search................ 260/683.15; 252/465, 252/470

[56] References Cited
UNITED STATES PATENTS
2,703,789 3/1955 McKinley et al. .............. 252/470 X
3,268,617 8/1966 Menapace et al. ............. 252/470 X
3,493,493 2/1970 Henke et al. .................... 252/465 X
3,689,589 9/1972 Reusser........................... 260/683.15
3,330,882 7/1967 Albright.......................... 260/683.15
3,527,839 9/1970 Glockner et al. ............... 260/683.15
3,590,093 6/1971 Crain et al. ..................... 260/683.15

Primary Examiner—Paul M. Coughlan, Jr.
Attorney—Wenderoth, Lind & Ponack

[57] ABSTRACT

Pentenes are produced by codimerizing ethylene with propylene in the vapor phase in the presence of a nickel oxide-tungsten oxide catalyst, the atom ratio of nickel to tungsten being in the range of about 1:3 to 3:1, supported on a carrier at a temperature of 150°–450°C under pressure of 1 to 150 atmospheric pressures.

5 Claims, No Drawings

METHOD FOR PRODUCING PENTENES

This invention relates to a method for producing pentenes, especially isopentenes by codimerizing ethylene with propylene in the vapor phase with the use of a solid catalyst containing nickel oxide and at least one of tungsten oxide and molybdenum oxide which are supported on a carrier.

Heretofore, no successful production of pentenes with a high yield has been accomplished by codimerizing ethylene with propylene in the vapor phase with the use of a solid catalyst.

Isoprene, which is one of the most important materials for synthetic rubber, has been synthesized by dehydrogenation of isopentenes, but isopentenes have never been produced by codimerizing ethylene with propylene in the vapor phase with the use of a solid catalyst.

An object of this invention is to provide a method for producing pentenes with a high yield by codimerizing ethylene with propylene in the vapor phase with a solid catalyst.

Another object of this invention is to provide a method for producing isopentenes by codimerizing ethylene with propylene in the vapor phase with a solid catalyst.

Further object of this invention is to provide a catalyst which is useful for the production of pentenes by codimerizing ethylene with propylene in the vapor phase with a high selectivity.

Other objects of this invention will be apparent to those skilled in the art upon reading the following description.

According to the process of this invention, codimerization of ethylene and propylene is carried out by contacting gaseous ethylene and propylene with the solid catalyst at an elevated temperature.

Though it is usually desirable to employ pure ethylene and propylene as the reactants, pure reactants are not necessarily essential in producing pentenes with a good yield. They may contain diluents or other materials as long as these diluents and other materials do not adversely affect the codimerization itself nor destroy the catalyst. Examples of inert diluents are saturated hydrocarbons such as propane, butane, hexane and the like, carbon dixoide, nitrogen gas, helium gas, etc.

Molar ratio of ethylene and propylene to be fed is stoichiometrically 1:1, but, it may be used in the range of, usually, about 10:1–about 1:30 preferably, about 2:1 –about 1:6, more preferably, about 1:1 – about 1:3.

The contact time of the reactants with the catalyst is usually about 0.1 – 1,000 seconds, desirably, about 1 – 300 seconds, more desirably, about 5 – 100 seconds;

$$\text{Contact time (sec.)} = \frac{\text{Volume of the catalyst used (liter)}}{\text{Feeding velocity of reactants gas (liter/sec.)}}$$

[Reduced to Standard Temperature and Pressure (hereinafter referred to as STP)]

The reaction temperature in the process of this invention depends somewhat on the molar ratios of the reactants to be fed, components of the catalyst, manners for preparation of the catalyst and contact times, but it appears to be, generally, of about 60°– about 700°C, desirably about 150°– about 500°C, more desirably, about 150°– about 450°C.

In the codimerization, there is some increasing tendency of the yield of isopentenes in the reaction mixture as the reaction temperature is elevated, on the other hand, there is some increasing tendency of the yield of n-pentene in the reaction mixture as the reaction temperature is lowered.

The pressure in the process of this invention may be varied broadly from a reduced pressure, for example 0.1 atmospheric pressure to a super-atmospheric pressure, for example, about 300 atmospheric pressures. Successful experiments have been conducted within the range of about 1–150 atmospheric pressure, particularly, about 1 – 50 atmospheric pressures.

Any conventional reactors, for example, fixed bed reactors, fluidized bed reactors and moving bed reactors may be employed.

In the process of this invention, besides pentenes, butenes, hexenes and a small amount of by-product, for instance, oily hydrocarbons are produced simultaneously. The desired products may be separated from the reaction mixture by per se known manners, for example, by cooling the reaction mixture to liquidify the desired products or by passing the reaction mixture through a solvent in order to absorb the desired products in the solvent. The desired products may be purified by the conventional manner, for example, by rectification or extractive distillation. Unreacted starting materials and by-products may be removed from the reaction mixture through conventional manners and the former may be recycled as starting materials.

The catalysts employed in this invention contain nickel oxide and at least one of tungsten oxide and molybdenum oxide which are supported on a solid carrier. Atom ratio of nickel to the total of tungsten and molybdenum in the catalyst may be varied broadly, but it is usually used in the range of about 1 : 50 – about 50 : 1, preferably, about 1 : 10 –about 10 : 1, more preferably, about 1 : 3 – about 3 : 1. The combined use of tungsten oxide and molybdenum oxide in the catalyst generally gives stable activity to the catalyst. In case of the combined use of tungsten oxide and molybdenum oxide in the catalyst, the preferred atom ratio of tungsten to molybdenum is about 100 : 1 – about 1 : 10 and more preferably is about 20 : 1 – about 1 : 2. Moreover, the addition of oxides of cobalt and/or oxides of chromium to the catalyst as a promoter gives an increasing tendency of selectivity of pentenes, and the atom ratio of nickel to the total of cobalt and chromium may be used in the range of about 1000 : 1 – about 1 : 1, desirably, about 300 : 1–about 5 : 1.

The catalyst may contain other metal oxides as long as they do not adversely affect the codimerizing ethylene with propylene.

The catalyst may be prepared by means of the per se known manners [c.f. Edited by Paul H Emmet, Catalysis, vol. 1, 315–352 (1954)] with the use of the starting materials of the catalyst, that is, nickel compounds and at least one of tungsten and molybdenum compounds, and carrier substances, occasionally, cobalt and/or chromium compounds. For example, the starting materials of the catalyst are mixed or kneaded by means of so-called "Impregnation method", "Wet mixing method", "Precipitation method" and "Gel formation method", and subjected to forming, drying and heating.

Examples of the nickel compounds employed in the preparation of the catalyst are nickel oxides such as NiO, $NiO_2$ and $Ni_2O_3$ and any other nickel compounds, which can be converted to nickel oxide by pyrolyzing alone or hydrolyzing and pyrolyzing, such as $Ni(OH)_2$, $NiH_2$, salts, e.g. nickel halides, ($NiCl_2$, $NiBr_2$, etc.), Ni(-

$NO_3)_2$, $NiSO_4$, $NiCO_3$, $Ni_3(PO_4)_2$, $NiWO_4$, $NiMoO_4$, complexes e.g. nickel dimethyl glyoxime, nickel ammine salts, etc. Examples of tungsten and molybdenum compounds are tungsten and molybdenum oxides such as $WO_2$, $MoO_2$, $WO_3$ and $MoO_3$ and any other tungsten and molybdenum compounds, which can be converted to the tungsten and molybdenum oxides by pyrolyzing alone or hydrolyzing and pyrolyzing, such as complex oxides, e.g. $CaWO_4$, $CaMoO_4$, $NiWO_4$, $NiMoO_4$, $(NH_4)_2WO_4$, $(NH_4)_2MoO_4$, acids and acid salts, e.g. $H_2WO_4$, $H_2MoO_4$, $(NH_4)_6W_7O_{24}$, $(NH_4)_6Mo_7O_{24}$, halides, e.g. $WF_6$, $MoF_6$, $WCl_2$, $MoCl_2$, oxyhalides, e.g. $WO_2Cl_2$, $MoO_2Cl_2$, polyacids and polyacid salts, e.g. $H_4(SiW_{12}O_{40})$, $H_4(SiMo_{12}O_{40})$, $H_3(AlW_{12}O_{40})$, $H_3(AlMo_{12}O_{40})$, $H_3(AsW_{12}O_{40})$, $H_3(AsMo_{12}O_{40})$, $(NH_4)_2H(PW_{12}O_{40})$, $(NH_4)_2H(PMo_{12}O_{40})$, $H_9(AlW_6O_{24})$, $H_9(AlMo_6O_{24})$, $H_{10}(NiW_6O_{24})$, $H_{10}(NiMo_6O_{24})$, $H_6(CrW_6O_{24})$, $H_6(CrMo_6O_{24})$, $H_{10}(CrW_6O_{24})$, $H_{10}(CrMo_6O_{24})$, $NiH(AlW_{12}O_{40})$, $NiH(AlMo_{12}O_{40})$, bronzes, e.g. $M_xWO_3$, $M_xMoO_3$ (wherein M means metal atom such as Li, Na, K, Ag, Tl, Cu, Zn, Cd and $x$ is smaller number than 1), complexes, e.g. $H_3[W(CN)_8]$, $H_3[Mo(CN)_8]$, and sulfides e.g. $WS_2$, $MoS_2$, $WS_3$, $MoS_3$.

Examples of the cobalt compounds are cobalt oxides such as $CoO$, $Co_3O_4$, $Co_2O_3$ and $CoO_2$, and any other cobalt compounds, which can be converted to cobalt oxide by pyrolyzing alone or hydrolyzing and pyrolyzing, such as $Co(OH)_2$, cobalt salts, e.g. cobalt halides ($CoCl_2$, $CoBr_2$, etc.), $Co(NO_3)_2$, $CoSO_4$, $CoCO_3$, $Co_3(PO_4)_2$, $CoWO_4$, $CoMoO_4$, cobalt amine salts and cobalt complexes, e.g. $Co(NH_3)_6Cl_3$. Examples of the chromium compounds are oxides of chromium such as $CrO$, $Cr_2O_3$ and $CrO_3$ and any other chromium compounds, which can be converted to the oxides of chromium by pyrolyzing alone or hydrolyzing and pyrolyzing, such as hydroxides, e.g. $Cr(OH)_2$, $Cr(OH)_3$, halides, e.g. $CrCl_2$, $CrCl_3$, $CrBr_2$, $CrBr_3$, oxyhalides, e.g. $CrO_2Cl_2$, $CrO_2Br_2$, salts, e.g. $CrSO_4$, $Cr_2(SO_4)_3$, $Cr(NO_3)_2$, $Cr(NO_3)_3$, acids and their salts, e.g. $H_2Cr_2O_7$, $H_2Cr_3O_{10}$, $H_2Cr_4O_{13}$, $K_2Cr_2O_7$, $K_2Cr_3O_{10}$, $K_2Cr_4O_{13}$, complexes, e.g. $Cr_4(NH_3)_4Cl_3$.

Any carrier substances may be employed in the preparation of the catalyst so long as they have heat-stableness and large specific surface. Examples of suitable carrier are alumina, silica, silica-alumina, zeolite, magnesia, alumina-baria, aluminium phosphate, active charcoal, among them, alumina is desirably employed. In the practical prparation of the catalyst, it is desirable to employ the materials which are converted to the carrier substances mentioned above by heating such as alumina hydrosol, alumina hydrogel, silica hydrosol, silica hydrogel or magnesium hydroxide. The percentage of the carrier substance to the catalyst may be varied broadly, however, it is usually about 5 – 99.9 percent by weight, desirably about 10 – 99 percent by weight, more desirably about 20 – 90 percent by weight.

The catalyst is usually formed or sieved prior to heating or calcinating. Forms and sizes of the catalyst depend upon the types of the reactors employed. For instance, pellets or particles are used conveniently for fixed or moving bed reactors and powder is used conveniently for fluidized bed reactors.

The catalyst is usually activated by heating or calcinating. The heating or calcinating is carried out at a temperature of about 100° – 1,200°C, desirably about 350° – 750°C for about 0.5 – 100 hours, preferably about 1–24 hours, in the presence of oxidizing atmospheres such as air, oxygen gas and other atmospheres such as nitrogen gas, steam, paraffines and olefins. Two or more atmospheres may be changed in the heating.

The catalysts thus prepared are very suitable for the production of pentenes, especially isopentenes, by codimerizing ethylene with propylene in the vapor phase.

When the catalytic activity is reduced in the way of the process of this invention by carbonaceous deposition on the catalyst, it can be recovered by purging off the deposition with air, oxygen gas, steam, nitrogen gas or the mixture thereof.

The term "conversion" is the total percent by mole of "ethylene" and "propylene" which have undergood reaction. The term "selectivity" is the percent by mol of based on total products obtained. The term "distribution" is the percent by mole of a specific pentene based on the total pentenes obtained.

EXAMPLE 1

A. Preparation of a catalyst by "Impregnating method"

Commercially available alumina hydrosol (produced and sold by Nissan Kagaku Kogyo in Japan under the trade name of Colloidal Alumina-200) is dried up on a water bath and is heated at 600°C for 11 hours in an electric furnace. After cooling, the obtained hard lumps of alumina are ground and sieved to give the particles of 30 – 62 mesh.

The particles are impregnated with a saturated aqueous solution of nickel nitrate and dried up, and impregnated with a saturated aqueous solution of para-ammonium tungstate and dried up, then heated to about 500°C for 5 hours in the presence of air. Atom ratio of Ni : W : Al in the catalyst thus obtained is 1 : 1 : 18.

B. Production of pentenes

The catalyst is packed in a fixed bed tubular reactor and subjected to pre-treating at 400°C for 2 hours while passing nitrogen gas through the reactor. While controlling the reaction temperature at 390°C, the mixed gas of ethylene and propylene (molar ratio of ethylene : propylene is 1 : 1) is fed to the reactor under atmospheric pressure so that the contact time may be about 20 seconds (at STP).

About 10 ml. of the reaction mixture is sampled one hour after the beginning of the reaction and analyzed by gas chromatography.

The results are shown in Table 1

TABLE 1

| | |
|---|---|
| Conversion of ethylene | 75 |
| Conversion of propylene | 65 |
| Selectivity of pentenes | 40 |
| Distribution of specific pentenes | |
| trans-pentene-2 | 23 |
| cis-pentene-2 | 14 |
| 1-pentene-2 | 3 |
| 2-methyl-2-butene | 45 |
| 2-methyl-1-butene | 14 |
| 3-methyl-1-butene | 1 |

Example 2

Codimerization of ethylene with propylene is carried out with the use of the same catalyst as employed in Example 1 (A) in a manner similar to Example 1 except employing the various reaction temperatur as shown in Table 2. The products are analyzed in the same manner as Example 1.

TABLE 2

| Experiment No. | 1 | 2 | 3 |
|---|---|---|---|
| Reaction temperature (°C) | 200 | 260 | 320 |
| Conversion of ethylene | 25 | 33 | 44 |
| Conversion of propylene | 13 | 23 | 35 |
| Selectivity of pentenes | 38 | 41 | 40 |
| Distribution of specific pentenes: | | | |
| trans-pentene-2 | 50 | 45 | 38 |
| cis-pentene-2 | 25 | 24 | 20 |
| 1-pentene-2 | 8 | 7 | 4 |
| 2-methyl-2-butene | 15 | 18 | 31 |
| 2-methyl-1-butene | 2 | 6 | 7 |
| 3-methyl-1-butene | 0 | 0 | 0 |

Example 3

The catalyst in which atom ratio of Ni : Mo : Al is 1 : 1 : 18 is prepared with the use of commercially available alumina hydrosol and aqueous solutions of nickel nitrate and para-ammonium molybdate in a similar manner to Example 1 (A).

After the manner in Example 1 (B), codimerization of ethylene and propylene, and analysis of the exit gas are conducted. The results are shown in Table 3.

Table 3

| | |
|---|---|
| Conversion of ethylene | 50 |
| Conversion of propylene | 43 |
| Selectivity of pentenes | 32 |
| Distribution of specific pentenes | |
| trans-pentene-2 | 21 |
| cis-pentene-2 | 15 |
| 1-pentene-2 | 4 |
| 2-methyl-2-butene | 46 |
| 2-methyl-1-butene3-methyl-1-butene | 13 |

Example 4

A. Preparation of the catalyst by "Impregnating method"

The particles of alumina obtained in the same manner as Example 1 (A) are impregnated with an aqueous solution of nickel nitrate and dried up, then impregnated with an aqueous solution of para-ammonium tungstate and an aqueous solution of para-ammonium molybdate and dried up. The obtained particles are heated at about 500°C for 5 hours in the presence of air. Atom ratio of Ni : W : Al in the catalyst obtained is 1 : 0.5 : 0.5 : 4.

B. Production of pentenes

After the manner in Example 1 (B), codimerization of ethylene and propylene, and analysis of the exit gas are conducted. The results are shown in Table 4.

Table 4

| | |
|---|---|
| Conversion of ethylene | 71 |
| Conversion of propylene | 59 |
| Selectivity of pentenes | 39 |
| Distribution of specific pentenes | |
| trans-pentene-2 | 22 |
| cis-pentene-2 | 14 |
| 1-pentene-2 | 4 |
| 2-methyl-2-butene | 45 |
| 2-methyl-1-butene | 14 |
| 3-methyl-1-butene | 1 |

Example 5

A. Preparation of the catalyst by "Wet mixing method"

Commercially available alumina hydrosol (produced and sold by Nissan Kagaku Kogyo in Japan under the trade name of Colloidal Alumina-200), powdery para-ammonium tungstate and a saturated aqueous solution of nickel nitrate are kneaded with a kneader for 3 hours and dried for 24 hours at 130°C. The obtained hard lumps are ground and sieved to give the particles of 30 – 62 mesh and calcinated for 5 hours at 500°C in the presence of air. Atom ratio of Ni : W : Al in the catalyst obtained is 1 : 1 : 4.

B. Production of pentenes

The catalyst is packed in a fix bed tubular reactor and subjected to pre-treating at 400°C for 2 hours while passing nitrogen gas through the reactor. Then, the mixture of ethylene and propylene (molar ratio of ethylene : propylene is 1 : 3) is fed to a reactor under atmospheric pressure so that the contact time may be about 10 seconds (at STP) while controlling the reaction temperature at about 350°C. One hour after the beginning of the reaction, about 10 ml. of the exit gas is sampled and analyzed by gas chromatography and the results are shown in Table 5.

TABLE 5

| | |
|---|---|
| Conversion of ethylene | 84 |
| Conversion of propylene | 25 |
| Selectivity of pentenes | 49 |
| Distribution of specific pentenes | |
| trans-pentene-2 | 18 |
| cis-pentene-2 | 11 |
| 1-pentene-2 | 2 |
| 2-methyl-2-butene | 50 |
| 2-methyl-1-butene | 19 |
| 3-methyl-1-butene | 0 |

Example 6

Codimerization of ethylene and propylene is carried out with the use of the same catalyst as used in Example 5 (A) in a manner similar to Example 5 (B) except that mole ratio of ethylene : propylene is 1 : 1 and the reaction temperature is 200°C. Sampling and analysis of the exit gas are conducted in the same manner as Example 5 (B) The results are shown in Table 6.

TABLE 6

| | |
|---|---|
| Conversion of ethylene | 21 |
| Conversion of propylene | 11 |
| Selectivity of pentenes | 34 |
| Distribution of specific pentenes | |
| trans-pentene-2 | 43 |
| cis-pentene-2 | 25 |
| 1-pentene-2 | 8 |
| 2-methyl-2-butene | 19 |
| 2-methyl-1-butene | 5 |
| 3-methyl-1-butene | 0 |

Example 7

A. Preparation of the catalyst by "Wet mixing method"

Commercially available alumina hydrosol (Colloidal Alumina-200), powdery para-ammonium tungstate and saturated aqueous solution of nickel nitrate are kneaded with a kneader for 3 hours and dried for 24 hours at 130°C. The obtained hard lumps are ground and sieved to give the particles of 30 –62 mesh. The particles are impregnated with an aqueous solution of cobalt nitrate and dried up, then calcinated for 5 hours at 500°C in the presence of air. Atom ratio of Ni : W : Co : Al in the catalyst obtained is 1 : 1 : 0.1 : 4.

B. Production of pentenes

After the manner in Example 6, codimerization of ethylene and propylene is conducted and the exit gas is sampled and analyzed. The results are shown in Table 7.

TABLE 7

| | |
|---|---|
| Conversion of ethylene | 20 |
| Conversion of propylene | 11 |
| Selectivity of pentenes | 39 |
| Distribution in pentenes | |
| trans-pentene-2 | 43 |
| cis-pentene-2 | 25 |
| 1-pentene-2 | 7 |
| 2-methyl-2-butene | 20 |

| | |
|---|---|
| 2-methyl-1-butene | 5 |
| 3-methyl-1-butene | 0 |

Example 8

A. Preparation of the catalyst

The catalyst in which atom ratio of Ni : W : Cr : Al is 1 : 1 : 0.1 : 4 is prepared with the use of commercially available aluminasol, powdery para-ammonium tungstate, saturated aqueous solution of nickel nitrate and aqueous solution of chromium nitrate in a similar manner to Example 7 A.

B. Production of pentenes

After the manner in Example 6, codimerization of ethylene and propylene, and analysis of the exit gas are conducted. The results are shown in Table 8.

TABLE 8

| | |
|---|---|
| Conversion of ethylene | 16 |
| Conversion of propylene | 8 |
| Selectivity of pentenes | 38 |
| Distribution in pentenes | |
| Trans-pentene-2 | 42 |
| cis-pentene-2 | 23 |
| 1-pentene-2 | 7 |
| 2-methyl-2-butene | 22 |
| 2-methyl-1-butene | 6 |
| 3-methyl-1-butene | 0 |

Example 9

A. Preparation of the catalyst

The catalyst in which atom ratio of Ni : W : Al is 1 : 3 : 36 is prepared in a similar manner to Example 5 (A).

B. Production of pentenes

Codimerizing ethylene with propylene is conducted in the same manner as Example 6. The sampling and analysis of the exit gas are conducted in the same manner as Example 5 (B). The results are shown in Table 9.

TABLE 9

| | |
|---|---|
| Conversion of ethylene | 14 |
| Conversion of propylene | 8 |
| Selectivity of pentenes | 35 |
| Distribution in pertenes | |
| trans-pentene-2 | 43 |
| cis-pentene-2 | 24 |
| 1-pentene-2 | 8 |
| 2-methyl-2-butene | 21 |
| 2-methyl-1-butene | 4 |
| 3-methyl-1-butene | 0 |

Example 10

A. Preparation of the catalyst by "Wet mixing method"

Commercially available silica hydrosol(produced and sold by Nissan Kagaku Kogyo in Japan under the trade name of Snowtex-O powder of para-ammonium tungstate and a saturated aqueous solution of nickel nitrate are kneaded with a kneader for 3 hours, and dried at 120°C for 12 hours. The obtained lumps are ground and sieved to give the particles of 30 – 62 mesh. The particles are calcinated at 500°C for 5 hours. The atom ratio Ni : W : Si in the catalyst is 1 : 1 : 38.

B. Production of pentenes

Using the catalyst thus obtained, codimerization of ethylene and propylene and analysis of the exit gas are carried out in the same manner as Example 1 B. The results are shown in Table 10.

TABLE 10

| | |
|---|---|
| Conversion of ethylene | 70 |
| Conversion of propylene | 63 |
| Selectivity of pentenes | 38 |
| Distribution of specific pentenes | |
| trans-pentene -2 | 29 |
| cis-pentene -2 | 17 |
| 1-pentene-2 | 5 |
| 2-methyl-2-butene | 39 |
| 2-methyl-1-butene | 9 |
| 3-methyl-1-butene | 1 |

What is claimed is:

1. A method for the production of pentenes in high yield by codimerizing ethylene with propylene which comprises contacting a feed consisting essentially of ethylene and propylene in the vapor phase in the presence of a catalyst consisting of nickel oxide and tungsten oxide supported on a carrier, wherein the atom ratio of nickel to tungsten is in the range of about 1:3 to about 3:1, the weight percent of the carrier to the catalyst being about 5 to about 99.9, at a temperature of about 150° to about 450°C under a pressure of about 1 to about 150 atmospheres.

2. A method according to claim 1, wherein the carrier is alumina.

3. A method according to claim 1, wherein the molar ratio of ethylene and propylene is about 10 : 1 to about 1 : 30; the contact time is in the range of about 0.1 to about 1000 seconds (at STP).

4. A method according to claim 3, wherein the carrier is alumina.

5. A method for the production of pentenes in high yield by codimerizing ethylene with propylene which comprises contacting a feed consisting essentially of ethylene and propylene in the vapor phase in the presence of a catalyst consisting of nickel oxide and tungsten oxide supported on a carrier, wherein the atom ratio of nickel to tungsten is in the range of about 1:3 to about 3:1, and at least one of the oxides of cobalt and chromium, the atom ratio of nickel to the total of cobalt and chromium being about 1,000:1 to about 1:1, the weight percent of the carrier to the catalyst being about 5 to about 99.9, at a temperature of about 150° to about 450°C under a pressure of about 1 to about 150 atmospheres.

* * * * *

UNITED STATES PATENT OFFICE
CERTIFICATE OF CORRECTION

Patent No. 3,764,636                Dated October 19, 1973

Inventor(s) ETSURO ECHIGOYA and ATSUO KOBAYASHI

It is certified that error appears in the above-identified patent and that said Letters Patent are hereby corrected as shown below:

In the heading of the patent the assignee should be shown as -- said Kobayashi assor. to said Echigoya --.

Signed and sealed this 10th day of September 1974.

(SEAL)
Attest:

McCOY M. GIBSON, JR.                C. MARSHALL DANN
Attesting Officer                    Commissioner of Patents